(12) United States Patent
Mochizuki

(10) Patent No.: US 7,138,590 B2
(45) Date of Patent: Nov. 21, 2006

(54) VEHICLE ELECTRIC EQUIPMENT SWITCH ASSEMBLY AND OPERATION LEVER ASSEMBLY THEREOF

(75) Inventor: Yoshimichi Mochizuki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/131,185

(22) Filed: May 18, 2005

(65) Prior Publication Data

US 2005/0269192 A1 Dec. 8, 2005

(30) Foreign Application Priority Data

May 18, 2004 (JP) ............................ P2004-147843

(51) Int. Cl.
*H01H 9/00* (2006.01)

(52) U.S. Cl. .................................. 200/61.54; 200/61.3

(58) Field of Classification Search ............ 200/61.54, 200/335, 61.27, 17 R, 61.3, 4
See application file for complete search history.

(56) References Cited

U.S. PATENT DOCUMENTS

| | | | |
|---|---|---|---|
| 6,172,314 B1 * | 1/2001 | Uehira et al. ............ | 200/61.54 |
| 6,222,142 B1 * | 4/2001 | Sano ........................ | 200/61.54 |
| 6,225,582 B1 * | 5/2001 | Stadler et al. ........... | 200/61.27 |
| 6,236,044 B1 * | 5/2001 | Chou et al. ................ | 250/330 |
| 6,246,128 B1 * | 6/2001 | Sugata ....................... | 307/10.1 |
| 6,501,033 B1 * | 12/2002 | Pastwa et al. ........... | 200/61.27 |
| 6,518,524 B1 * | 2/2003 | Brandt et al. ............ | 200/61.54 |
| 6,756,550 B1 * | 6/2004 | Ficek et al. .............. | 200/61.54 |
| 6,848,773 B1 * | 2/2005 | Hoisington et al. ........... | 347/68 |
| 6,872,897 B1 * | 3/2005 | Otani et al. ............... | 200/16 D |
| 6,891,115 B1 * | 5/2005 | Rudolph et al. ......... | 200/61.54 |
| 6,956,177 B1 * | 10/2005 | Tanaka ..................... | 200/61.54 |

* cited by examiner

*Primary Examiner*—Elvin Enad
*Assistant Examiner*—Lisa Klaus
(74) *Attorney, Agent, or Firm*—Finnegan, Henderson, Farabow, Garrett & Dunner, L.L.P.

(57) ABSTRACT

An operation lever assembly includes an operation lever including a manipulator to operate a vehicle electric equipment switch assembly. The operation lever assembly includes a guide configured to guide the manipulator into the operation lever for regular mounting.

5 Claims, 5 Drawing Sheets

VEHICLE ELECTRIC EQUIPMENT SWITCH ASSEMBLY AND OPERATION LEVER ASSEMBLY THEREOF

CROSS-REFERENCE TO RELATED APPLICATIONS

This application is based upon and claims the benefit of priority from Japanese Patent Application No. 2004-147843 filed on May 18, 2004; the entire contents of which are incorporated herein by reference.

BACKGROUND OF THE INVENTION

The invention relates to operation lever assembly used for a combination switch.

The patent application publication laid-open No. Hei11-134973 discloses a combination switch mounted to a steering shaft. The combination switch includes a lever projected to operate the combination switch. This lever includes an operation portion on one side, while including, on the other side, an arm member to operate a switch assembly. The operation portion moves a manipulator, allowing contact with the switch assembly to be switched.

When the arm member, however, is mounted to the other side of the operation lever, the arm member is mountable in a regular mounting direction or in the opposite direction. This causes false mounting of the arm member to the switch assembly, or mounting in the opposite direction. In this case, the operation portion does not regularly operate the switch assembly, thus failing to switch the contact.

SUMMARY OF THE INVENTION

The invention is directed to an operation lever assembly for a combination switch to prevent false mounting of a manipulator to the operation lever.

The first aspect of the invention provides an operation lever assembly for a vehicle electric equipment switch assembly. The operation lever assembly includes an operation lever including a manipulator to operate a vehicle electric equipment switch assembly. The operation lever assembly includes a guide configured to guide the manipulator into the operation lever for regular mounting.

The guide may include a channel; and a projection to be guided by the channel.

The operation lever may include a lever base. The operation lever includes a shaft mounted to the lever base. The lever base includes an insertion hole for inserting the shaft therethrough. The lever base includes a mounting recess having the shaft protruding thereinto; and the manipulator received therein. The projection is fixed to the manipulator to abut against the opening periphery of the mounting recess during false mounting of the manipulator to the mounting recess. The channel is defined by the opening periphery of the mounting recess, allowing the projection to pass through the channel during regular mounting of the manipulator to the mounting recess.

The manipulator may include a manipulator body having a hole for inserting and mounting the shaft therethrough. The manipulator may include an arm extending from the manipulator body at a predetermined angle. The manipulator may include a pusher fixed to the arm to operate the vehicle electric equipment switch assembly.

The second aspect of the invention may provide a vehicle electric equipment switch assembly. The assembly may include a switch configured to switch vehicle electric equipment. The assembly may include an operation lever including a manipulator to operate the switch. The assembly includes a guide configured to guide the manipulator into the operation lever for regular mounting.

According to the aspects, the guide allows the manipulator to be regularly mounted to the operation lever or the lever base, thus achieving regular mounting of the manipulator to the shaft. The regular mounting allows for regular operation of the switch assembly when the operation lever and the switch assembly are mounted to each other.

During mounting of the manipulator to the mounting recess of the lever base, the projection passes through the channel, allowing for regular mounting of the manipulator to the mounting recess. If the manipulator is falsely mounted during housing of the manipulator in the mounting recess, the projection abuts against the opening periphery of the mounting recess. The abutting prevents false mounting of the manipulator to the mounting recess.

BRIEF DESCRIPTION OF THE ACCOMPANYING DRAWINGS

DETAILED DESCRIPTION OF THE PREFERRED EMBODIMENTS

The embodiment of the invention will be described with reference to the drawings.

Figure 1:
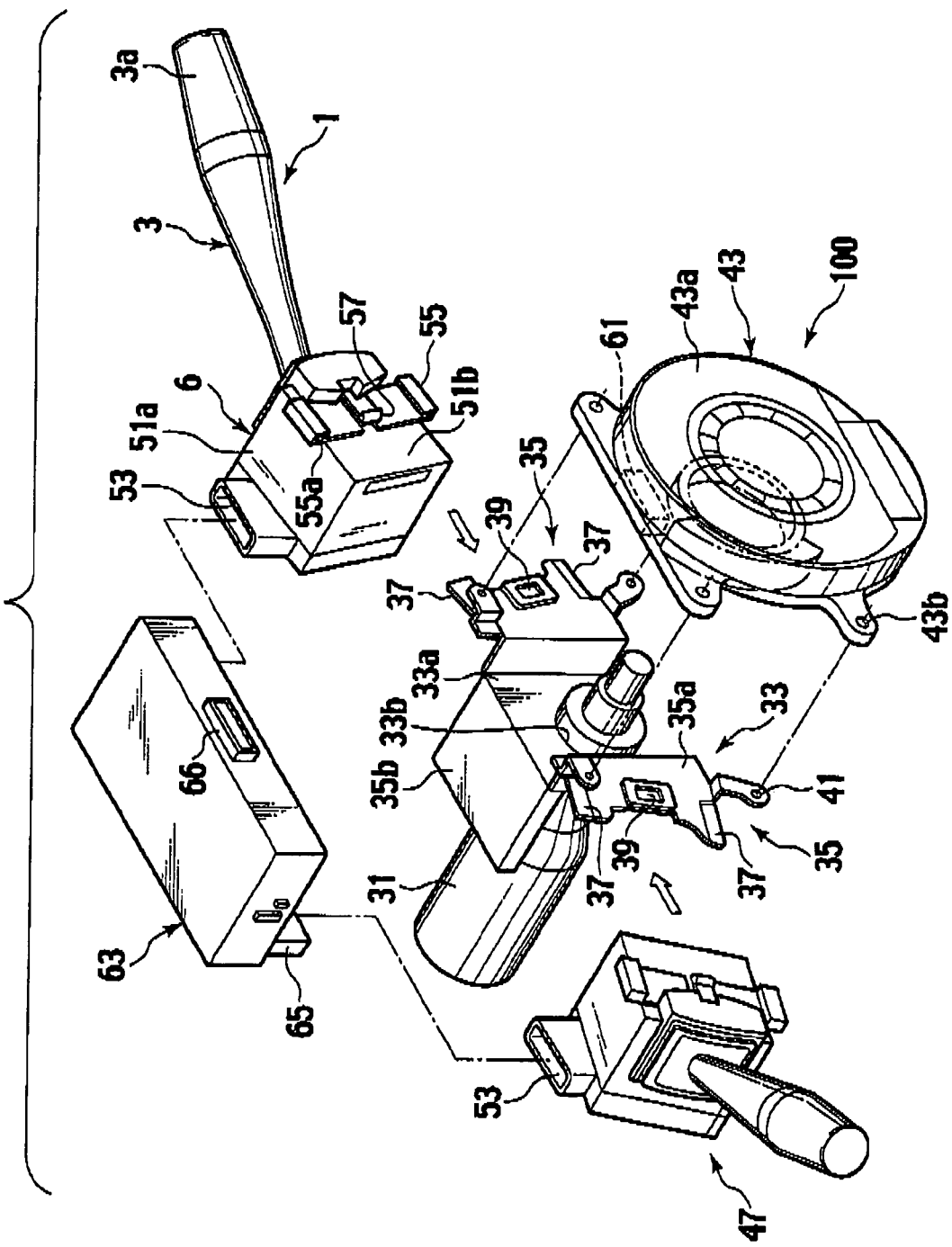
FIG. 1 is an exploded perspective view illustrating a multiplex combination switch assembly according to the invention.

With reference to FIG. 1, a combination switch 100 includes a turn lever unit 1 configured to operate a head lamp and a turn lamp. The combination switch 100 includes a wiper lever unit 47 to operate a wiper and a washer. The combination switch 100 includes a spiral cable unit 43. The combination switch 100 includes a multiplex communication unit 63 electrically connected to the turn lever unit 1, the wiper lever unit 47, and the spiral cable unit 43. The combination switch 100 includes a bracket 33 provided to a steering shaft 31.

The bracket 33 is fixed to a vehicle body. The bracket 33 has a hole 33b at the central portion of base plate 33a, to which the steering shaft 31 is fitted with a play. The bracket 33 has a pair of support plates 35 on both sides of the base plate 33a.

Each of the support plates 35 has a guide 37, locking hole 39, and a fixation piece 41. The fixation piece 41 is fixed to the fixation hole 43b of the spiral cable unit 43 using a screw. One of the support plates 35 is mounted to the turn lever unit 1, while the other is mounted to the wiper lever unit 47.

The turn lever unit 1 and wiper lever unit 47 has an identical structure, and the turn lever unit 1 is described as a representative. The turn lever unit 1 includes an operation lever 3; and a switch assembly 6 with a connector 53, a mounting channel 55, and a resilient locking pawl 57.

The connector 53 is movably mounted to the housing 51a of a switch assembly 6 using a resilient arm.

The switch assembly 6 houses a switch mechanism therein. The operation lever 3 has a proximal end supported in the switch assembly 6. The operation lever 3 is rotated to switch the contact of the switch mechanism. The switch is transmitted to the connector 53.

The operation lever 3 has, at the end, a push button or rotation knob switch 3a. When the operator operates the knob switch 3a, the operation switches the contact of the switch mechanism. The switch is transmitted to the connector 53.

The switch assembly 6 has, on the front side 51b, a resilient locking pawl 57 projecting towards the support plate 35 of the bracket 33. The resilient locking pawl 57 is engaged in the locking hole 39 of the support plate 35.

The mounting channels 5 are positioned symmetrically to the resilient locking pawl 57 on the front side 51b of the switch assembly 6. The mounting channels 55 have end openings 55a open towards the support plate 35. The guide 37 of the support plate 35 enters the end opening 55a.

Figure 2:
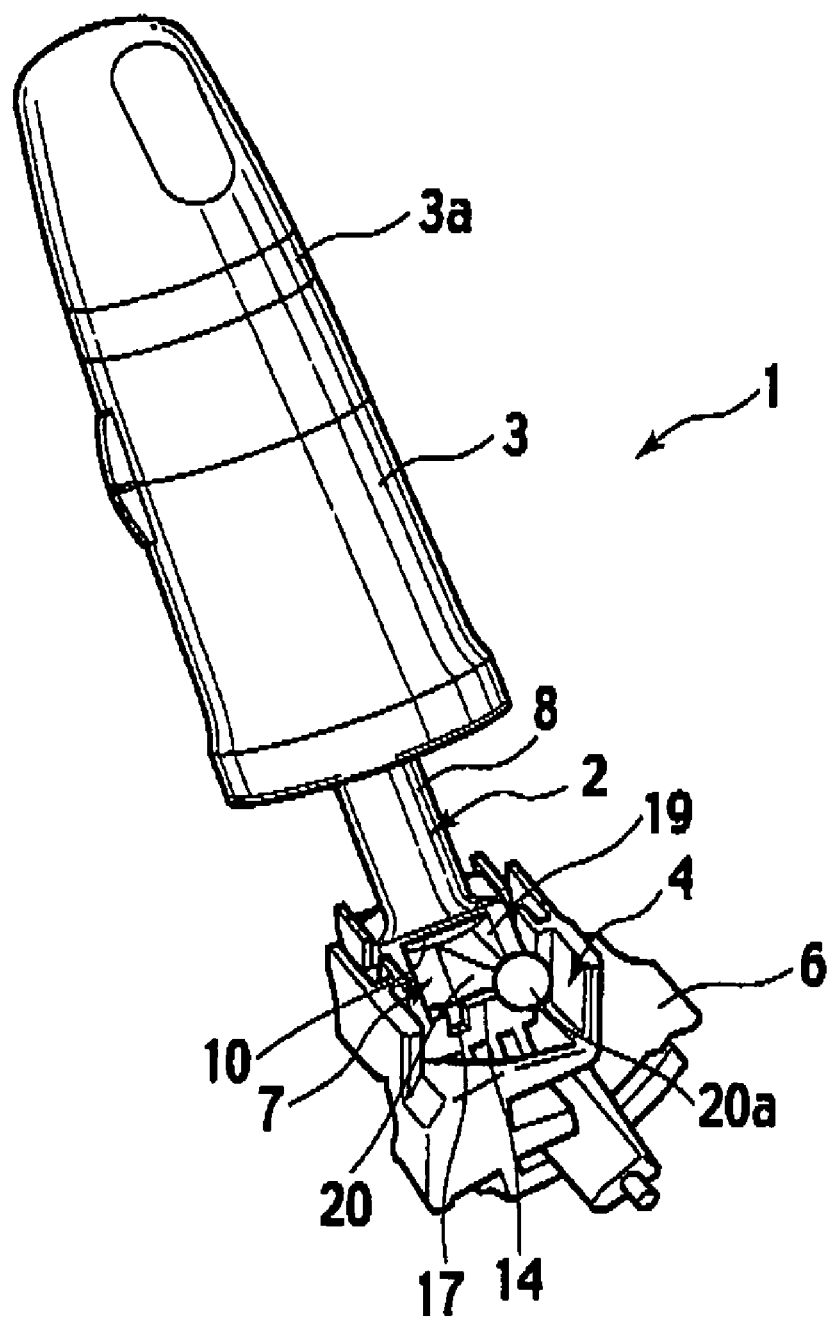
FIG. 2 is a perspective view illustrating the mounted operation lever and the switch assembly in FIG. 1.

With respect to FIG. 2, the turn lever unit 1 includes a lever base 2. The turn lever unit 1 includes an operation lever 3 on a side of the lever base 2. The turn lever unit 1 includes a joint portion 4 provided on the other side of the lever base 2. The turn lever unit 1 includes a shaft 5 rotatably housed in the lever base 2. The turn lever unit 1 includes an arm member or a manipulator 7 mounted on the joint portion 4. The manipulator 7 is joined to the shaft 5, and is rotated by the operation lever 3 to activate the switch assembly 6.

Figure 3:
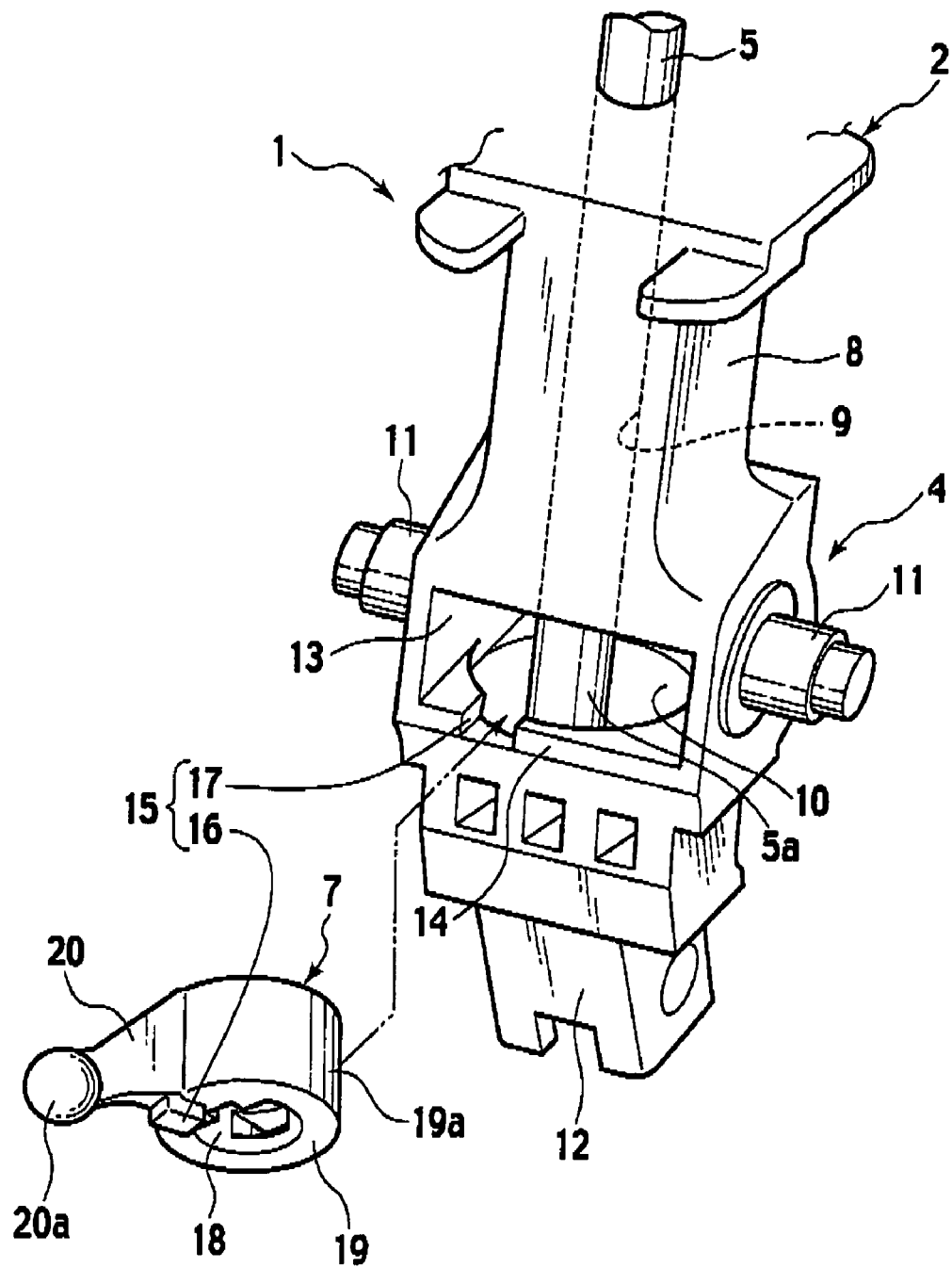
FIG. 3 is an exploded perspective view illustrating the mounting recess of the operation lever; and a manipulator mounted to the mounting recess.

With reference to FIG. 3, the lever base 2 includes a lever body 8. The lever base 2 includes a shaft insertion hole 9 positioned longitudinally to the lever body 8, in which the shaft 5 is inserted. The lever base 2 includes a mounting recess 10 provided to the joint portion 4. The mounting recess 10 has the manipulator 7 inserted thereinto and the end of the shaft 5 projecting thereinto. The joint portion 4 includes support shafts 11 supported to the switch assembly 6 and protruding from both sides of the mounting recess 10. The joint portion 4 includes, at the end, an engagement portion 12 engaged with the switch assembly 6.

The mounting recess 10 has an opening 13 formed on the side thereof, The manipulator 7 is inserted through the opening 13 for mounting. The opening periphery 14 of the opening portion 13 and the manipulator 7 include a mounting means or a guide 15 for regularly mounting the manipulator 7 to the lever base 2 to regularly mount the shaft 5 and the manipulator 7 to each other.

The guide 15 includes a projection 16 fixed to the manipulator 7. The projection 16 abuts against the opening periphery 14 of the mounting recess 10 when being falsely mounted to the mounting recess 10. The guide 15 includes a cut or channel 17 provided to the opening periphery 14 of the mounting recess 10. During regular mounting, the projection 16 passes through the cut 17.

The manipulator 7 includes a tubular arm body or manipulator body 19 with a mounting hole 18 having the end of a shaft 5 inserted thereinto for mounting. The manipulator 7 includes an arm 20 that projects from the outer peripheral side wall 19a of the manipulator body 19 at a given angle. The arm 20 has, at the end, a spherical portion or pusher 20a formed thereto that operates the switch mechanism of the switch assembly 6. The manipulator 7 includes a rectangular projection 16 provided to the manipulator body 19.

The spiral cable unit 43 houses a cable to supply electricity to auxiliaries on the steering. The spiral cable unit 43 includes a connector 61 on the back side. The connector 61 connects to the end of the housed cable. The connector 61 is movably mounted to, for example, the housing 43a of the spiral cable unit 43.

The multiplex communication unit 63 includes a multiplex communication circuit to send and receive a variety of signals on an identical transmission line and, in addition, houses an electric supply circuit for the spiral cable unit 43. The multiplex communication unit 63 includes fixed connectors 65 and 66 fitted into the connector 53 of the turn lever unit 1, the connector 53 of the wiper lever unit 47 and the connector 61 of the spiral cable unit 43.

Next, the procedure of assembling the manipulator 7 to the lever base 2 and the shaft 5 will be described.

With the end of the shaft 5 outside the mounting recess 10 so as not to project into the mounting recess 10, the manipulator 7 is inserted into the mounting recess 10. The manipulator 7 is inserted into the mounting recess 10 at the position where projection 16 passes through the cut 17, or the projection 16 is guided by the cut 17 to allow the manipulator 7 to be inserted into the mounting recess 10. That is, arm 20 is inserted into the mounting recess 10 to project in the opposite direction relative to the operation lever 3. Next, the shaft 5 is moved towards the engagement portion 12, and the end of the shaft 5 is inserted into the mounting hole 18 of the manipulator 7 to be engaged. In this state, the engagement portion 12 is engaged with the switch assembly 6.

Figure 4:
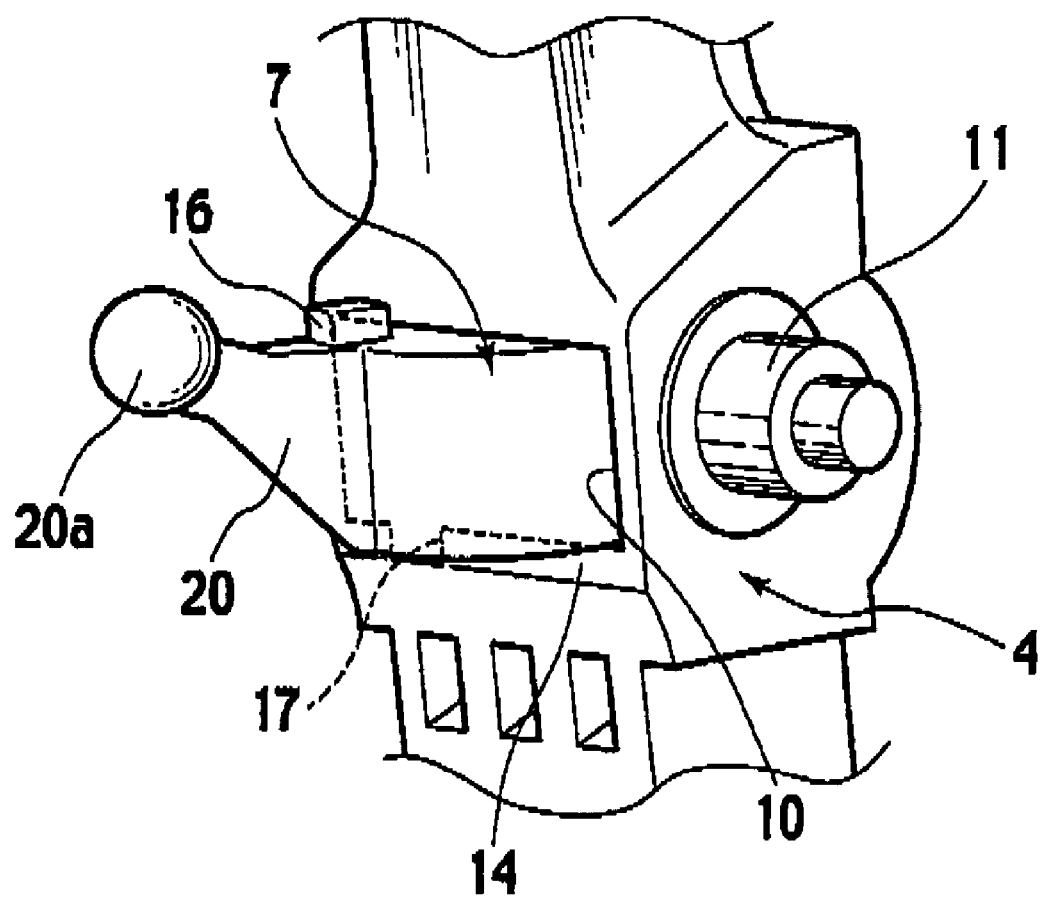
FIG. 4 is a perspective view illustrating false mounting of the manipulator to the mounting recess.

During assembly, if the manipulator 7 in the opposite position is inserted into the mounting recess 10, the projection 16 is positioned opposite to the cut 17 to abut against the opening periphery 14 as illustrated in FIG. 4. This results in the prevention of insertion of the manipulator 7 into the mounting recess 10, In this state, when the shaft 5 is moved towards the engagement portion 12, the end of the shaft 5 fails to be inserted into the mounting hole 18. It is found that the manipulator 7 is not completely (regularly) inserted into the mounting recess 10. This way prevents false mounting of the manipulator 7 to the mounting recess 10.

Next, the method of assembling a combination switch 100 will be described.

In FIG. 1, the turn lever unit 1 is mounted to the support plate 35 on one side of the bracket 33 (right in FIG. 1), while the wiper lever unit 47 is mounted to the support plate 35 on the other side (left of FIG. 1). The mounting of the lever units 1 and 47 allows the switch assembly 6 to be inserted into the mounting channel 55 and switch assembly 6 to be inserted along the guide 37 of the support plate 35, The resilient locking pawl 57 of the support plate 35 of the switch assembly 6 is locked with the locking hole 39.

Respective fixed connectors 65 are fixed to corresponding connectors 53 of the lever units 1 and 47, thus mounting the multiplex communication 63.

In such a way, with the turn lever unit 1, the wiper lever unit 47 and the multiplex communication unit 63 fixed to the bracket 33, the connector 61 is fixed to the fixed connector 66 to mount the spiral cable unit 43 to the multiplex communication unit 63. That is, the screw is inserted through the fixation hole 43b of the spiral cable unit 43. This screw is secured to the cable-unit fixation piece 41 of the support plate 35, to be screwed to mount the spiral cable unit 43 to the support plates 35 on both sides.

According to the embodiment, during mounting of the manipulator 7 to the turn lever unit 1, the guide 15 allows for regular assembly of the manipulator 7 to the turn lever unit 1, thus achieving regular switching of contact of the switch assembly 6.

When the manipulator 7 is inserted into the mounting recess 10, the projection 16 passes through the cut 17 or the projection 16 is guided by the cut 17 into the mounting recess 10, thus achieving regular mounting. While, when the manipulator 7 fails to be inserted into the mounting recess 10 or the projection 16 abuts against the opening periphery 14 of the mounting recess 10, the insertion direction of the manipulator 7 is found to be false and false mounting is realized. This securely prevents false mounting of the manipulator 7 to the turn lever unit 1.

In addition, the abutting of the projection 16 of the manipulator body 19 to the opening periphery 14 of the mounting recess 10 prevents false mounting of the manipulator 7 to the mounting recess 10. The projection 16 passes through the cut 17 so as to house and position the manipulator 7 to the mounting recess 10, thus achieving regular mounting.

Figure 5:
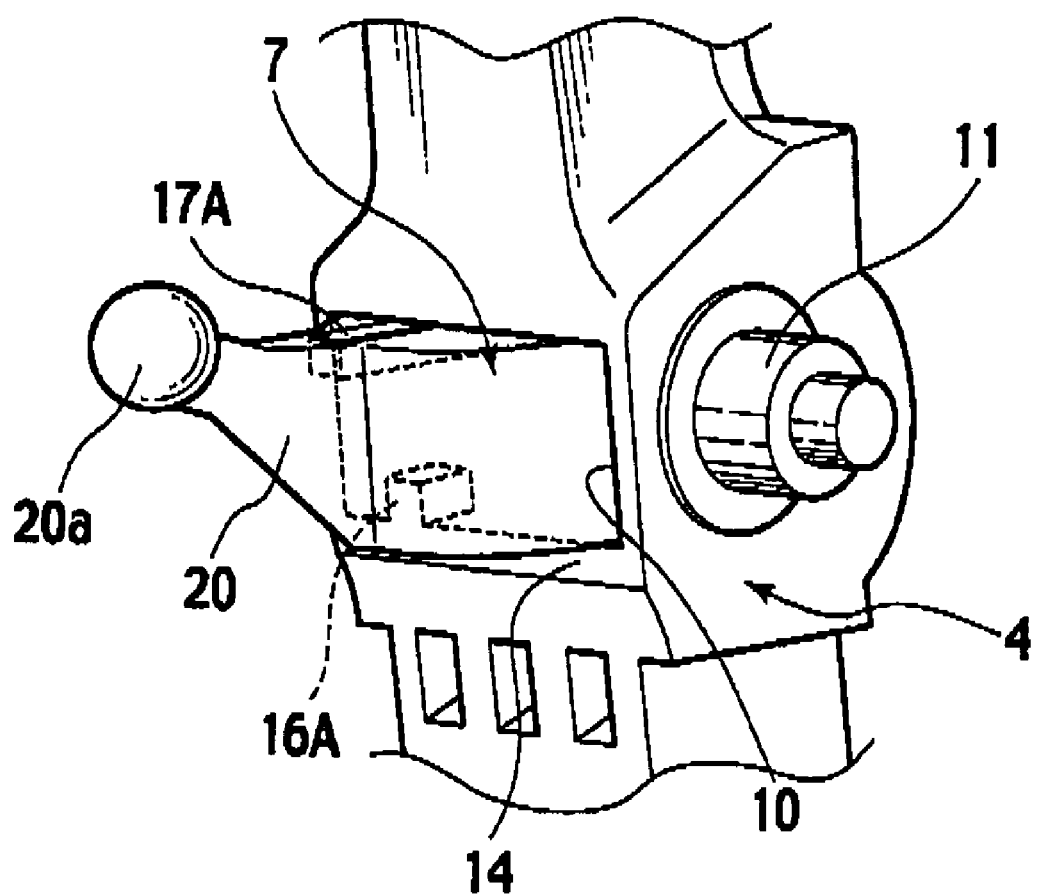
FIG. 5 is a perspective view illustrating false mounting of the manipulator to the mounting recess according to the modified embodiment.

In the embodiment, the projection 16 is provided to the manipulator body 19, and the cut 17 is provided to the mounting recess 10 for the projection 16 to pass therethrough. The projection 16A may be provided to the mounting recess 10, and the cut 17A is provided to the portion of the manipulator 20 for the projection 16A to pass through the cut 17A as illustrated in FIG. 5.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An operation lever assembly for a vehicle electric equipment switch assembly comprising:
   an operation lever comprising a manipulator to operate a vehicle electric equipment switch assembly; and
   a guide configured to guide the manipulator into the operation lever for regular mounting, wherein the manipulator includes a first portion and a second portion, the first portion disposed within a portion of the operation lever, and the second portion configured to protrude from the operation lever.

2. The operation lever assembly according to claim 1, wherein the guide comprises:
   a channel; and
   a projection to be guided by the channel.

3. The operation lever assembly according to claim 2, comprising:
   wherein the operation lever comprises:
      a lever base; and
      a shaft mounted to the lever base, wherein the lever base comprises:
         an insertion hole for inserting the shaft therethrough; and
         a mounting recess having the shaft protruding thereinto and the manipulator received therein, wherein the projection is fixed to the manipulator to abut against the opening periphery of the mounting recess during false mounting of the manipulator to the mounting recess, wherein the channel is defined by the opening periphery of the mounting recess, allowing the projection to pass through the channel during regular mounting of the manipulator to the mounting recess.

4. The operation lever assembly according to claim 3, wherein the manipulator comprises:
   a manipulator body having a hole for inserting and mounting the shaft therethrough;
   an arm extending from the manipulator body at a predetermined angle; and
   a pusher fixed to the arm to operate the vehicle electric equipment switch assembly.

5. A vehicle electric equipment switch assembly comprising:
   a switch configured to switch vehicle electric equipment;
   an operation lever comprising a manipulator to operate the switch; and
   a guide configured to guide the manipulator into the operation lever for regular mounting, wherein the manipulator includes a first portion and a second portion, the first portion disposed within a portion of the operation lever, and the second portion configured to protrude from the operation lever.

* * * * *